(12) United States Patent
Forster (10) Patent No.: US 10,186,126 B2
(45) Date of Patent: Jan. 22, 2019

(54) MULTI-PORT STRAPS INCORPORATING SENSING FEATURES

(71) Applicant: Avery Dennison Retail Information Services LLC, Mentor, OH (US)

(72) Inventor: Ian J. Forster, Essex (GB)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 0 days.

(21) Appl. No.: 14/854,093

(22) Filed: Sep. 15, 2015

(65) Prior Publication Data

US 2017/0076573 A1    Mar. 16, 2017

(51) Int. Cl.
| | |
|---|---|
| G08B 13/24 | (2006.01) |
| G06K 19/077 | (2006.01) |
| G06K 19/07 | (2006.01) |
| G09F 3/00 | (2006.01) |
| G09F 3/03 | (2006.01) |
| H01Q 9/26 | (2006.01) |
| H01Q 1/22 | (2006.01) |

(52) U.S. Cl.
CPC ..... *G08B 13/2417* (2013.01); *G06K 19/0716* (2013.01); *G06K 19/07773* (2013.01); *G06K 19/07798* (2013.01); *G08B 13/2431* (2013.01); *G09F 3/0297* (2013.01); *G09F 3/0335* (2013.01); *H01Q 9/26* (2013.01); *H01Q 1/2225* (2013.01)

(58) Field of Classification Search
CPC ....... G06K 19/07749; G06K 19/07798; G06K 19/07381; G06K 19/0723; G06K 19/0775

USPC ............................................ 340/572.1–572.9
See application file for complete search history.

(56) References Cited

U.S. PATENT DOCUMENTS

| | | | | |
|---|---|---|---|---|
| 4,918,432 A | * | 4/1990 | Pauley | G08B 21/22 340/10.1 |
| 6,888,509 B2 | * | 5/2005 | Atherton | G06K 19/073 235/492 |
| 7,095,324 B2 | * | 8/2006 | Conwell | G06K 19/073 340/572.1 |
| 7,304,578 B1 | | 12/2007 | Sayers et al. | |
| 7,652,575 B2 | * | 1/2010 | Lyons | G06K 19/0717 235/492 |
| 2002/0188259 A1 | | 12/2002 | Hickle et al. | |
| 2005/0012616 A1 | | 1/2005 | Forster et al. | |
| 2006/0261950 A1 | * | 11/2006 | Arneson | G06K 19/0723 340/572.1 |

(Continued)

FOREIGN PATENT DOCUMENTS

| | | |
|---|---|---|
| DE | 19720747 | 11/1997 |
| DE | 10012204 | 9/2001 |

(Continued)

OTHER PUBLICATIONS

International Search Report and Written Opinion dated Nov. 18, 2016 for International Application No. PCT/US2016/051805 filed Sep. 15, 2016.

*Primary Examiner* — Daniel Previl
(74) *Attorney, Agent, or Firm* — Avery Dennison Retail Information Services, LLC (57) ABSTRACT

The present invention discloses a multi-port strap device having multiple pads that can combine a connection to an RFID antenna and a sensing function, such as an open or closed circuit state, into the same structure.

14 Claims, 7 Drawing Sheets

(56) References Cited

U.S. PATENT DOCUMENTS

| | | | |
|---|---|---|---|
| 2007/0069895 A1* | 3/2007 | Koh | G06K 19/02 340/572.1 |
| 2007/0205900 A1* | 9/2007 | Pretorius | G06K 19/07372 340/572.8 |
| 2008/0150688 A1* | 6/2008 | Burr | G06K 19/0723 340/10.1 |
| 2012/0092027 A1 | 4/2012 | Forster | |
| 2012/0218110 A1* | 8/2012 | Forster | G06K 19/07372 340/572.1 |
| 2014/0062787 A1 | 3/2014 | Nazarov | |
| 2014/0263659 A1* | 9/2014 | Kervinen | G06K 19/027 235/488 |

FOREIGN PATENT DOCUMENTS

| | | |
|---|---|---|
| DE | 102011050196 | 11/2011 |
| DE | 102012211188 | 1/2014 |

\* cited by examiner

MULTI-PORT STRAPS INCORPORATING SENSING FEATURES

BACKGROUND

The present invention relates generally to a strap comprising multiple pads. Specifically, the pads combine a connection to an RFID antenna and a sensing component into the same structure. In accordance with embodiments of the present subject matter, the strap is a multi-port strap. Accordingly, the present specification makes specific reference thereto.

The use of radio frequency identification (RFID) to identify one of a plurality of items is well known. Typical RFID tags or integrated circuits include a microprocessor, also known as a microchip, electrically connected to an antenna. Alternatively, the microchip is first attached to a pad having electrical leads that provides a larger attachment or "landing" area. This is typically referred to as a "strap" or "interposer." The strap is then attached to the antenna. Specifically, interposers include conductive leads or pads that are electrically coupled to the contact pads of the chips for coupling to the pads on the antennas, whereupon the area of coupling is sufficient to provide efficient coupling at UHF (ultra high frequency) frequencies.

However, it is sometimes desirable to use an alternative chip with more than one port. The chip would comprise a first port for coupling to the antenna and a secondary port. This secondary port can be configured to perform a number of functions, such as determining the open or closed circuit state. Further, determination of the connection state of the secondary port is determined by a low frequency pulse, which does not couple efficiently via the capacitance that couples the UHF connection to the antenna.

Furthermore, the microprocessor within the RFID tags stores data, which can include identifying data unique to a specific item, which is transmitted to an external receiver (interrogator) for reading by an operator and processing of the item. The microprocessor also modulates a radio frequency (RF) signal that is transmitted via the antenna. The external reader (interrogator) is used to capture the data transmitted by the RFID tag. RFID tags can be attached to or associated with items, consumer or luxury goods, apparel or garments, consumable products such as food for inventory control, shipment control, loss prevention, and the like.

The present invention discloses a multi-port strap comprising an RFID antenna and a sensing component. Specifically, the strap has a UHF port for coupling to an antenna and a secondary port. An extended area connected to the secondary port functions as an anti-tamper area, wherein a change of state indicates that the label has been cut out of the garment.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a multi-port strap comprising an RFID antenna and a sensing component. The strap has a first port for coupling to an antenna and a secondary port. An extended area connected to the secondary port functions as an anti-tamper area, wherein a change of state indicates that the label has been cut out of the garment.

In a preferred embodiment, the secondary port, initially in a closed circuit state due to the structure of the strap, becomes an open circuit when the secondary port is cut, torn, or in any other way broken. Thus, this change of state can be associated with a printed fabric label in a garment, food freshness label, or other tag or label, including those situations where the elements of the tag or label are created on an apparel item such as through a heat transfer process and the structure of the RFID tag is applied over the heat transfer area, where the state change indicates that the label, tag or heat transfer has been cut out of the garment. Further, in an alternative embodiment, the secondary port is initially in an open circuit state and a material responsive to a sensed state can make it short circuit. Alternatively, in another embodiment, the conductors of the secondary port may be given access to an external environment and change state in response to the presence of an environmental factor, such as moisture.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a multi-port strap device having multiple pads that can combine a connection to an RFID antenna and a sensing function, such as an open or closed circuit state, into the same structure.

Straps carrying RFID chips are known in the art. For example, the pads of the strap can couple reactively to the pads on the antenna, whereupon the area of coupling is sufficient to provide efficient coupling at UHF (ultra high frequency) frequencies. However, it is sometimes desirable to use an alternative chip with more than one port; an example of this is the G2iL+ by NXP® semiconductors. This chip has a UHF port for coupling to an antenna and a secondary port. This secondary port can be configured to perform a number of different functions, one of which is to determine the open or closed circuit state of the chip. In this context, an open circuit is defined as having a resistance greater than a pre-defined value and a closed circuit is defined as having a resistance lower than the pre-defined value. The determination of the connection state of the port is then determined by a low frequency pulse, which does not couple efficiently via the capacitance that couples the UHF connection to the antenna.

Figure 1:
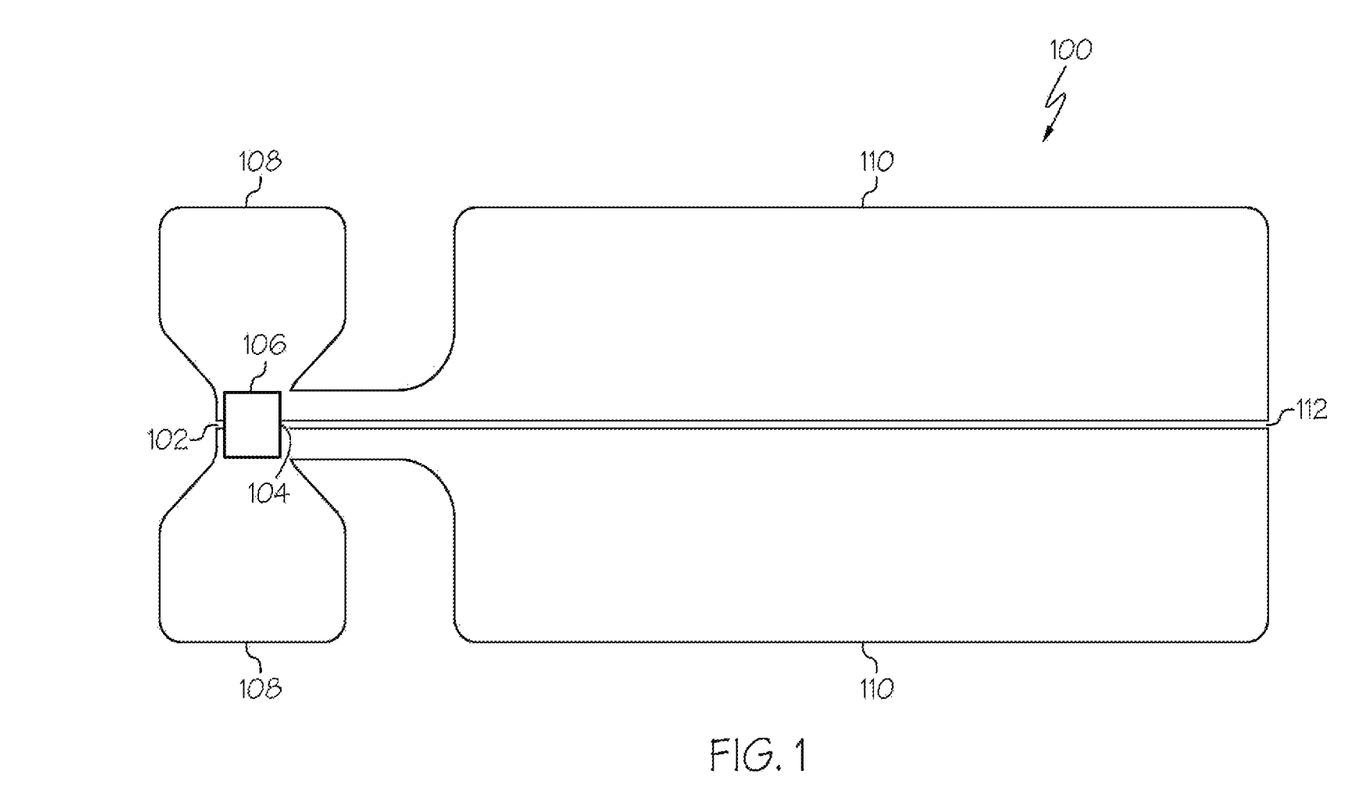
FIG. 1 illustrates a top view of the multi-port strap device in accordance with the disclosed architecture.

Referring initially to the drawings, FIG. 1 illustrates a first exemplary embodiment of a strap device 100 comprising two ports, a first port 102 and a secondary port 104. Specifically, the strap device 100 comprises a chip 106 and is coupled to a conductor structure, such as an antenna. Coupling between the antenna and strap device 100 may be a direct, conductive coupling or may be an indirect coupling, such as a capacitive or inductive coupling or any combination of conductive, capacitive and inductive coupling. The strap device 100 also comprises UHF (ultra high frequency) pads 108 on either side of the first port 102 for coupling to the antenna. Further, the strap device 100 comprises an extended area connected to the secondary port 104, such as extended port pads 110 coupled to the secondary port 104.

This extended area (i.e., extended port pads 110) can perform functions such as anti-tamper functions, wherein the secondary port 104, initially in a closed circuit state due to the structure of the strap device 100, becomes an open circuit when the extended port pads 110 of the secondary port 104 area are cut, torn or in any other way broken. Specifically, the secondary port 104 is an open/short circuit sensing port on the chip 106, such that when a user opens or shorts the circuit at the short circuit point 112, a change of state occurs. Accordingly, the secondary port 104, initially in a closed circuit state due to the structure of the strap device 100, becomes an open circuit (or short circuit) when the secondary port 104 is cut, torn, or in any other way broken. Thus, this change of state can be associated with a printed fabric label in a garment, or other tag or label provided on an apparel item, consumer good, food product or where the label or tag is created via a heat transfer product directly on the item where the state change indicates that the label has been cut out of the garment.

The strap device 100 structure can be any suitable size, shape, and configuration as is known in the art without affecting the overall concept of the invention. One of ordinary skill in the art will appreciate that the shape and size of the strap structure as shown in FIG. 1 is for illustrative purposes only and many other shapes and sizes of the strap structure are well within the scope of the present disclosure. Although dimensions of the strap structure (i.e., length, width, and height) are important design parameters for good performance, the strap structure may be any shape or size that ensures optimal performance and sensitivity during use.

The strap device 100 is coupled to an antenna, wherein the antenna structure can be any of a variety of materials, for example aluminum, copper, silver or another thin, conductive material, for example etched or hot-stamped metal foil, or any other suitable material as is known in the art, such as conductive ink which can be printed to make a suitable antenna. The antenna structure further comprises at least two conductor pads, or any suitable number of conductor pads as is known in the art.

Furthermore, FIG. 1 shows the strap device 100 with a first UHF port 102 and a secondary port 104 which can set a bit in the chip's 106 memory associated with the open/closed circuit state of the secondary port 104 as previously described. The detection or secondary port 104 is larger than the first or UHF antenna coupling port 102 to extend the area that a change in state can be detected over.

Figure 2:
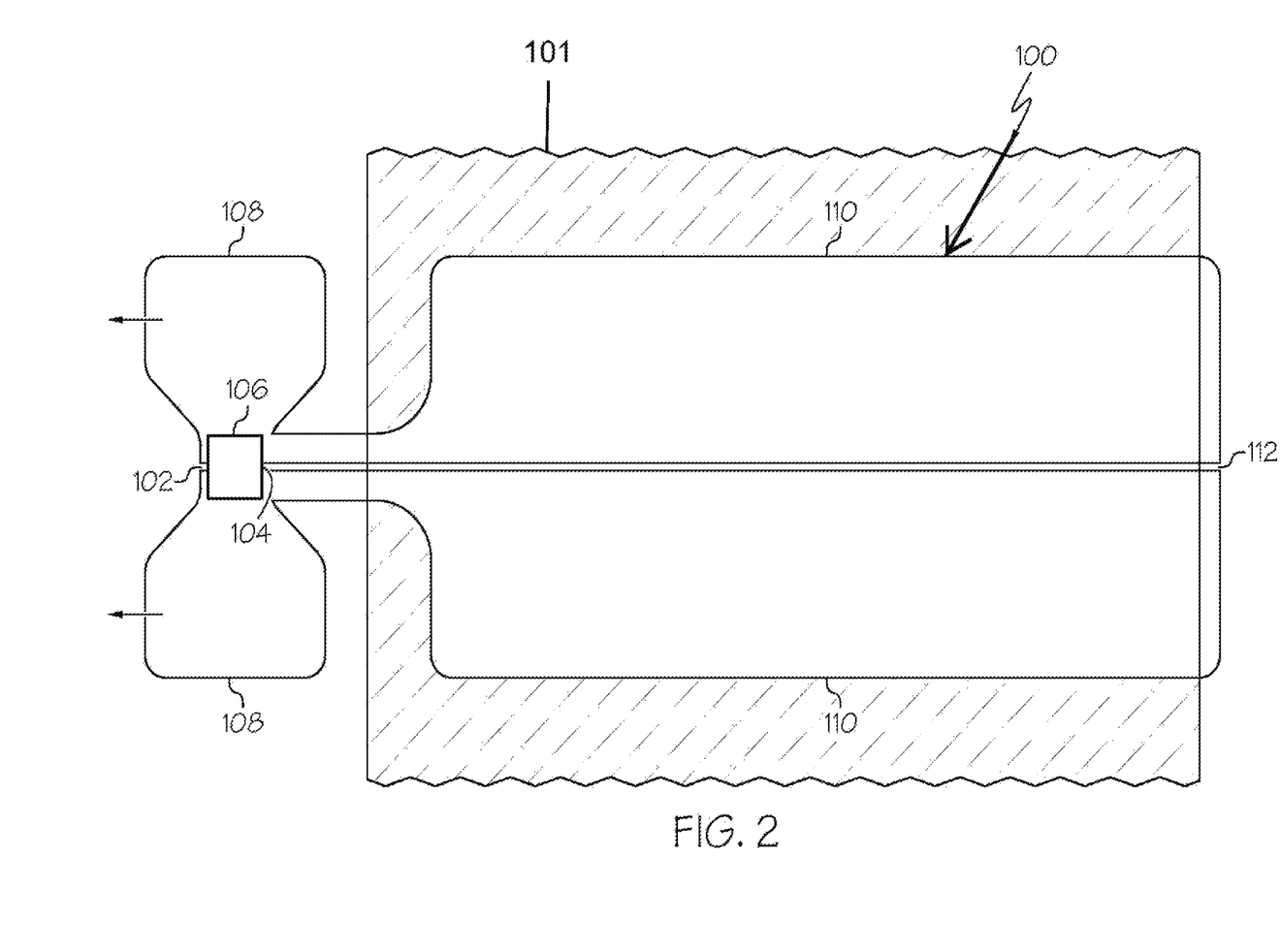
FIG. 2 illustrates a top view of the multi-port device showing the area where a transverse cut or other break will change the state of the secondary port in accordance with the disclosed architecture.

FIG. 2 discloses the strap device 100 and the extended area (i.e., extended port pads 110) across which a transverse cut or other break will change the state of the secondary port 104.

Figure 3:
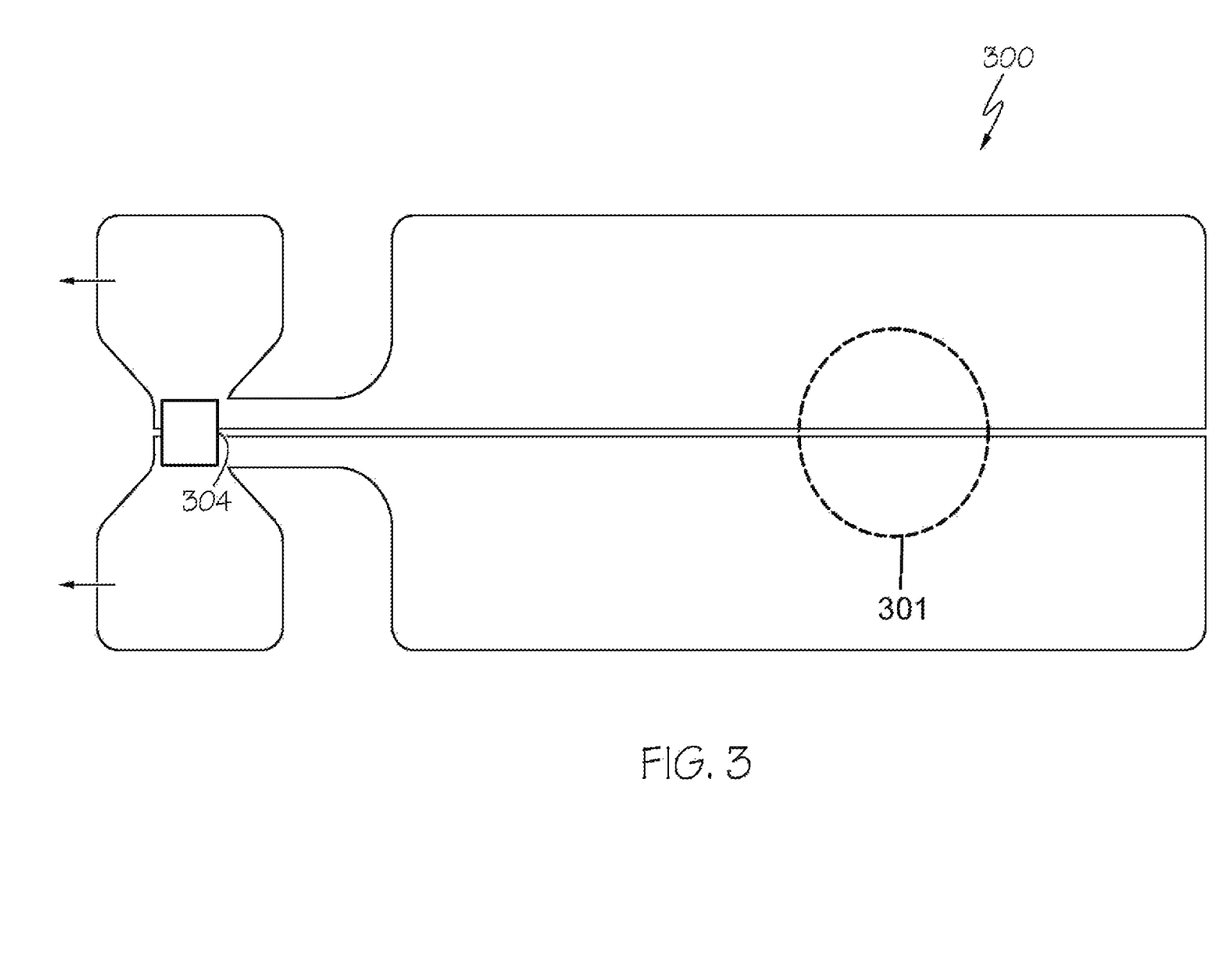
FIG. 3 illustrates a top view of an alternative embodiment of the multi-port device wherein the secondary port is initially in an open circuit state in accordance with the disclosed architecture.

FIG. 3 discloses an alternative embodiment wherein the secondary port 304 of the strap device 300 is initially an open circuit and a material responsive to a sensed state can make the secondary port 304 short circuit. Specifically, the material used changes resistance in response to an environmental condition, and the resistance, if it is above the open/short circuit threshold, maintains the initial open circuit state, but if it is below creates the short circuit state. The change of resistance can be associated with an environmental factor that can be sensed through a protective layer 101 designed to protect the antenna and strap, such as a film which can be a suitable plastic in one embodiment. The protective layer 101 can protect the antenna and strap from changes in temperature or light. Alternatively, the conductors of the secondary port 304 can be given access to an external environment through an aperture 301 in the protective layer 101. The presence of a conductive material in contact with the strap allows the secondary port 304 to change state in response to the presence of an environmental factor such as a conductive liquid, water.

Figure 3A:
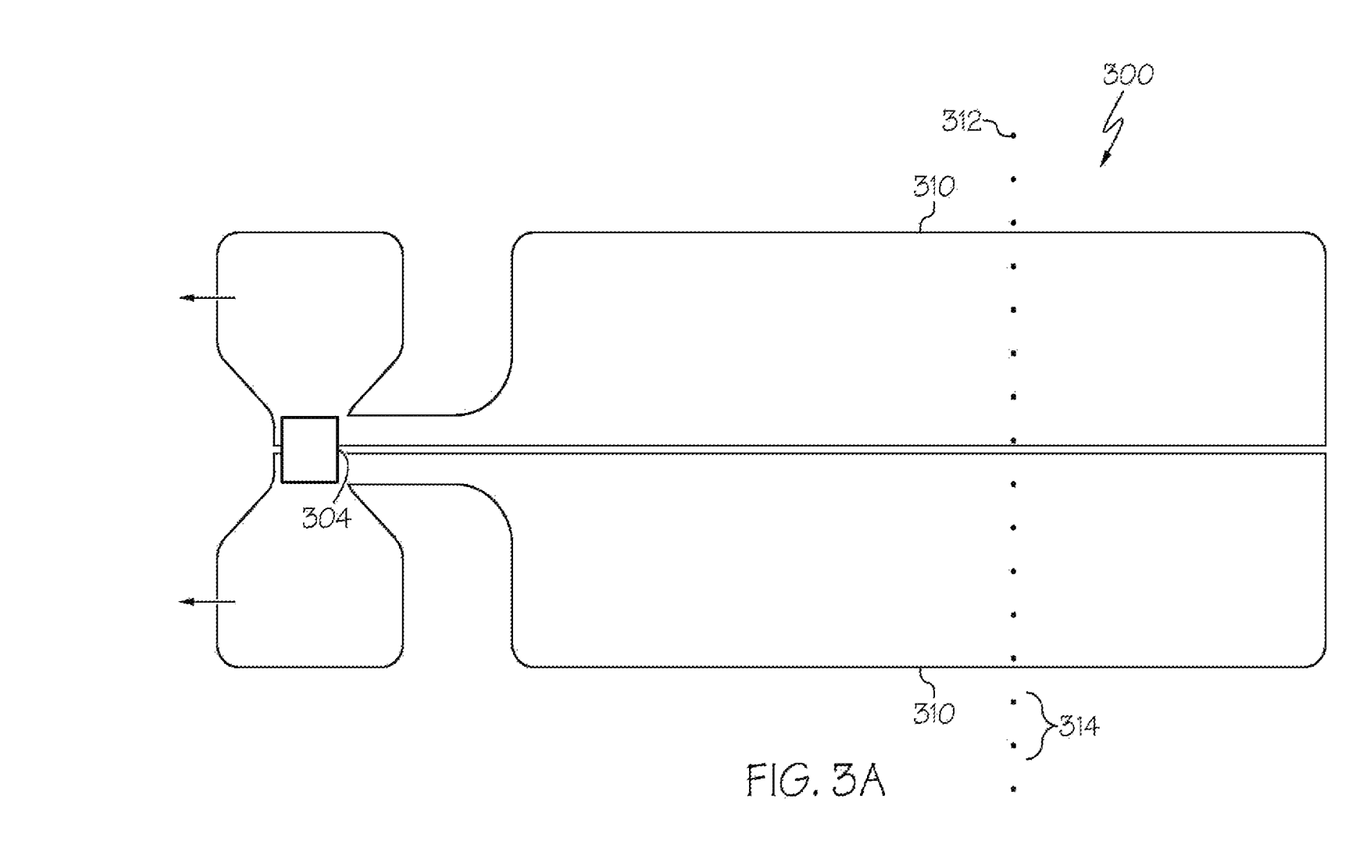
FIG. 3A illustrates a top view of the multi-port device showing how the strap is suitable for sewing into a garment in accordance with the disclosed architecture.

FIG. 3A discloses another feature of the strap device 300, wherein the relatively wide conductors of the strap device 300 stop the conductive path from being broken when a label carrying the tag is sewn into a garment. For example, the punctures 312 created by a sewing needle and line of stitches 314 to attach the tag to a garment are shown in FIG. 3A. The wide areas of the extended port pads 310 prevent the sewing of the tag into the garment to change the secondary 304 port state. The needle performing the sewing punches a series of holes for the stitches to pass through, at intervals. In one embodiment, for instance, the holes are approximately 1 mm diameter at a spacing of 2 mm a part apart. A thin line/pad, below 1 mm, can be cut by the needle prematurely changing the state of the port. By using wide pads, no combination of holes, regardless of how they are registered to the pads, can prematurely change the state from closed circuit to an open circuit.

Figure 4:
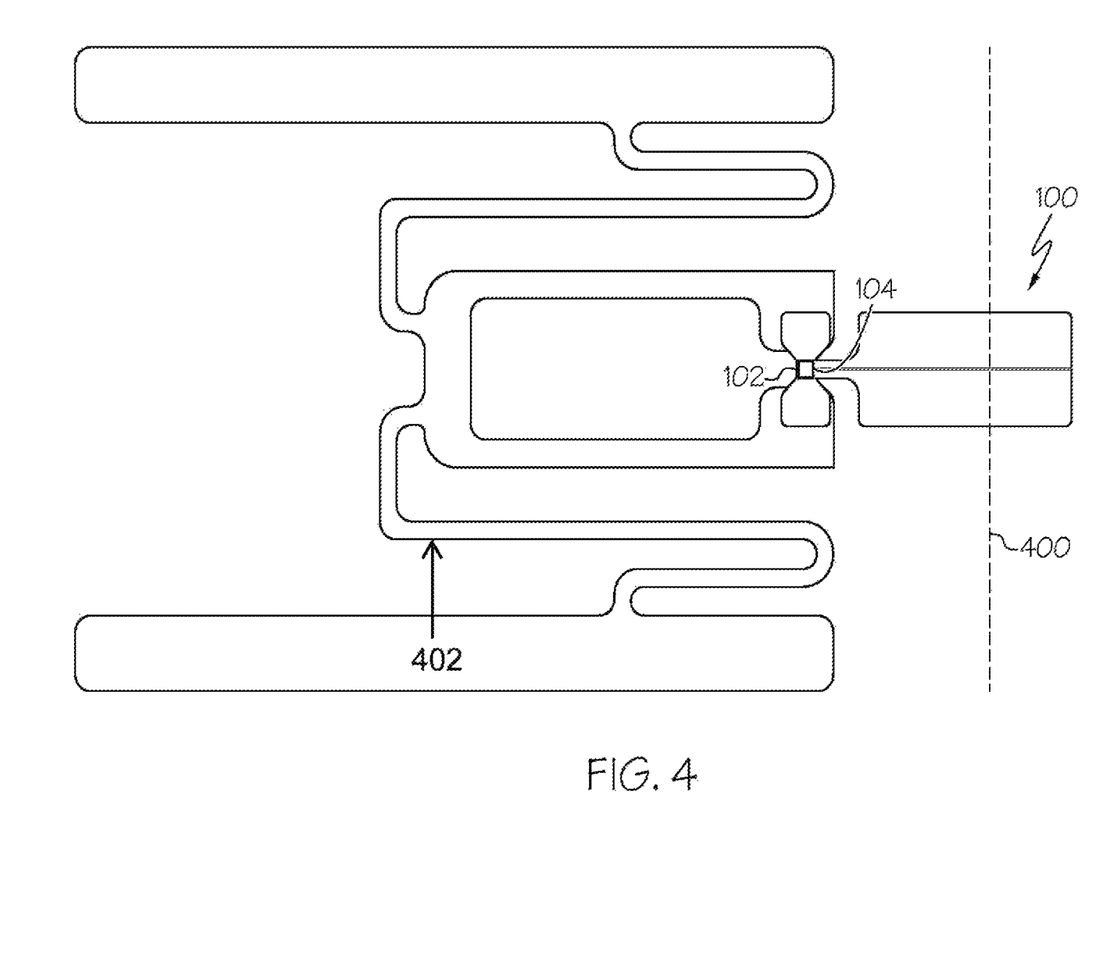
FIG. 4 illustrates a top view of the multi-port device with an UHF antenna showing how cutting the extended area would change the secondary port state in accordance with the disclosed architecture.

FIG. 4 discloses an example of a strap device 100 (i.e., tag) showing a line 400 where a label would commonly be removed or separated from a garment by cutting, wherein this cutting would change the secondary port 104 state, allowing the tag to perform anti-tamper functions. FIG. 4 also discloses the UHF antenna 402 coupled to the first port 102.

Figure 5:
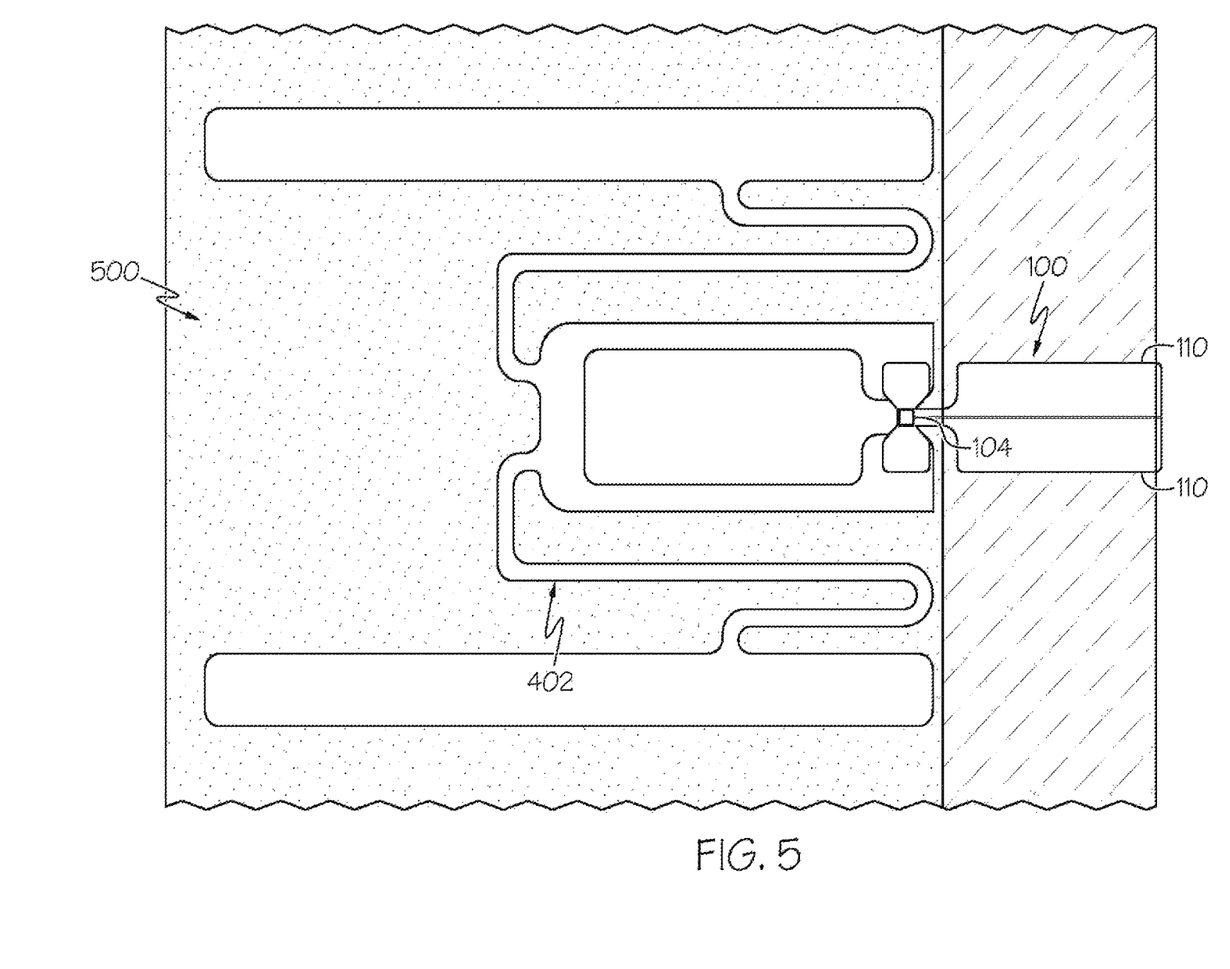
FIG. 5 illustrates a top view of the multi-port device showing that the extended strap prevents a cut through the anti-tamper area from damaging the UHF antenna in accordance with the disclosed architecture.

FIG. 5 discloses a feature of the extended strap device 100 and its associated antenna design, wherein the extended area (i.e., extended port pads 110) designed to function as the anti-tamper secondary port 104 is separate from the UHF antenna area 500, such that a cut through the anti-tamper secondary port 104 and/or extended port pads 110 does not damage or disable the UHF antenna 402. This allows the bit state to still be read remotely. Thus, the extended area (i.e., extended port pads 110) prevents cuts from damaging the UHF antenna 402, wherein a cut within the UHF antenna area 500 would reduce read range. However, a transverse cut in the anti-tamper region, extended area (i.e., extended port pads 110) changes state in the secondary port 104.

Figure 6:
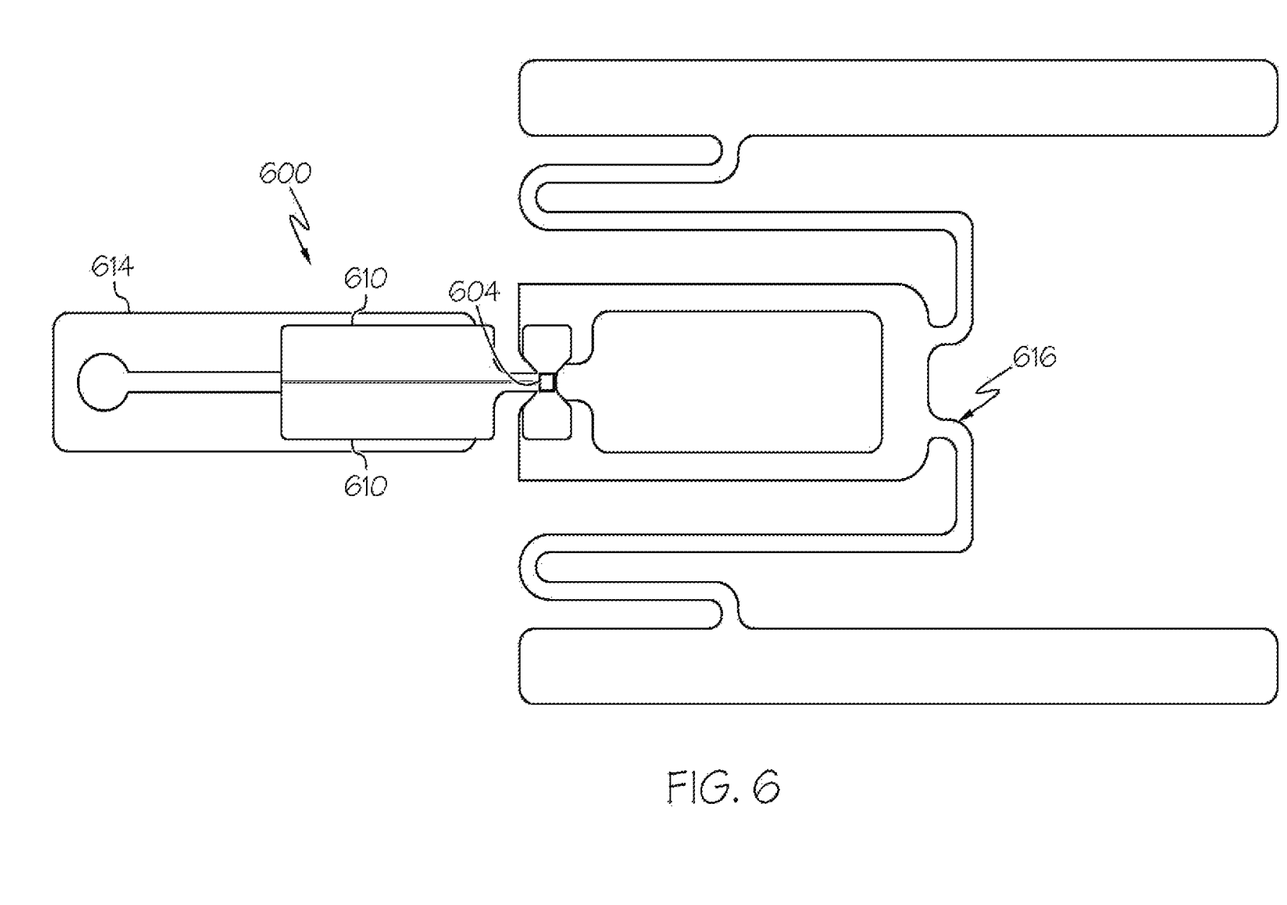
FIG. 6 illustrates a top view of an alternative structure of the multi-port device wherein the RFID chip detects the port state with a relatively low frequency pulse in accordance with the disclosed architecture.

FIG. 6 discloses an alternative embodiment wherein the strap device 600 is designed to work with an RFID chip that detects the secondary port 604 state with a relatively low frequency pulse, for example one lasting 100 nS. The extended area 610 of the secondary port 604 comprises large pads (i.e., a large coupling area) which are an open circuit, and the large pads couple to an anti-tamper/sensing structure 614 (i.e., an extended metal area formed as part of the UHF antenna 616) formed as part of the antenna process. Due to the large area of coupling from the large pads, the pulse can pass through the capacitive joints and determine the open/short circuit state of the loop.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A multi-port strap device, comprising:
 a chip;
 a first port for coupling to an antenna;
 a secondary port; and
 an extended area comprising a pair of extended port pads connected to the secondary port providing anti-tampering functions for the strap device; and
 wherein an individual extended port pad of the pair of the extended port pads is positioned on either side of the secondary port; and
 wherein the secondary port is initially in an open circuit state and material used to form the multi-port strap device is responsive to a sensed state by using resistance whereby the secondary port short circuits.

2. The multi-port strap device of claim 1, wherein the antenna is an (ultra high frequency) UHF antenna.

3. The multi-port strap device of claim 2, wherein the first port comprises a pair of UHF pads with an individual UHF pad positioned on either side of the first port for coupling to the antenna.

4. The multi-port strap device of claim 1, wherein an open circuit is defined as having a resistance greater than a pre-defined value and a closed circuit is defined as having a resistance lower than the pre-defined value.

5. The multi-port strap device of claim 1, wherein the multi-port strap device further comprises a protective layer and the extended port pads is are given access to an external environment through an aperture in the protective layer such that the secondary port changes state in response to a presence of an environmental factor.

6. The multi-port strap device of claim 5, wherein the environmental factor is moisture.

7. The multi-port strap device of claim 1, wherein the multi-port strap device communicates with the chip to detect the secondary port state with a low frequency pulse.

8. A multi-port strap device, comprising:
 a RFID chip;
 a first port and a pair of UHF pads with one UHF pad positioned on either side of the first port for coupling to an UHF antenna;
 a secondary port;
 a protective layer that protects the antenna and the chip; and
 a pair of extended port pads with an individual extended port pad positioned on either side of the secondary port to provide anti-tamper functions for the multi-port strap device; and
 wherein the pair of extended port pads connected to the secondary port are given access to an external environment through an aperture in the protective layer such that the secondary port changes state in response to a presence of an environmental factor.

9. The multi-port strap device of claim 8, wherein the secondary port is initially in a closed circuit state due to the structure of the multi-port strap device, and becomes an open circuit when the pair of extended port pads of the secondary port are cut or torn.

10. The multi-port strap device of claim 9, wherein an open circuit is defined as having a resistance greater than a pre-defined value and a closed circuit is defined as having a resistance lower than the pre-defined value.

11. The multi-port strap device of claim 8, wherein the multi-port strap device communicates with the RFID chip to detect the secondary port state with a low frequency pulse.

12. A multi-port strap device, comprising:
 a RFID chip;
 a first port and a pair of UHF pads with an individual UHF pad positioned on either side of the first port for coupling to an UHF antenna;
 a secondary port; and
 a pair of extended port pads with an individual extended port pad positioned on either side of the secondary port to provide anti-tamper functions for the multi-port strap device; and
 wherein the secondary port is initially in a closed circuit state due to a resistance of the multi-port strap device, and becomes an open circuit when the pair of extended port pads of the secondary port are cut or torn;
 wherein the coupling between the antenna and strap device may be any combination of conductive, capacitive and inductive coupling, and the multi-port strap device further comprises a protective layer and the antenna is given access to an external environment through an aperture in the protective layer such that the secondary port changes state in response to a presence of an environmental factor.

13. The multi-port strap device of claim 12, wherein the environmental factor is moisture.

14. The multi-port strap device of claim 12, wherein the multi-port strap device communicates with the RFID chip to detect the secondary port state with a low frequency pulse.

* * * * *